United States Patent
Azevedo et al.

(10) Patent No.: US 6,496,890 B1
(45) Date of Patent: Dec. 17, 2002

(54) BUS HANG PREVENTION AND RECOVERY FOR DATA COMMUNICATION SYSTEMS EMPLOYING A SHARED BUS INTERFACE WITH MULTIPLE BUS MASTERS

(76) Inventors: Michael Joseph Azevedo, 1144 Sterling Gate Dr., San Jose, CA (US) 95120-4246; Brent Cameron Beardsley, 4010 E. La Espalda, Tuscon, AZ (US) 85718; Bitwoded Okbay, 315 Mantelli Dr., Gilroy, CA (US) 95020; Carol Spanel, 6290 Camino Verde Dr., San Jose, CA (US) 95119; Andrew Dale Walls, 7219 Via Bella, San Jose, CA (US) 95139

( * ) Notice: Subject to any disclaimer, the term of this patent is extended or adjusted under 35 U.S.C. 154(b) by 0 days.

(21) Appl. No.: 09/454,681

(22) Filed: Dec. 3, 1999

(51) Int. Cl.[7] .......................... G06F 13/00; G06F 12/00
(52) U.S. Cl. ...................... 710/110; 710/107; 710/108; 710/109; 710/240
(58) Field of Search ................................. 710/107, 108, 710/109, 200, 220, 240, 241, 242, 243, 244, 117, 110, 124

(56) References Cited

U.S. PATENT DOCUMENTS

| | | |
|---|---|---|
| 4,117,459 A | 9/1978 | Douglas et al. |
| 4,118,792 A | 10/1978 | Struger et al. |
| 4,120,029 A | 10/1978 | Steiner |
| 4,131,945 A | 12/1978 | Richardson et al. |
| 4,213,178 A | 7/1980 | Diez et al. |
| 4,263,649 A | 4/1981 | Lapp, Jr. |
| 4,486,829 A | 12/1984 | Mori et al. |
| 4,610,013 A | 9/1986 | Long et al. |
| 4,689,766 A | 8/1987 | Kent |
| 4,872,110 A | 10/1989 | Smith et al. |
| 4,987,529 A * | 1/1991 | Craft et al. .................. 710/113 |
| 5,040,178 A | 8/1991 | Lindsay et al. |
| 5,146,596 A | 9/1992 | Whittaker et al. |
| 5,247,163 A | 9/1993 | Ohno et al. |
| 5,289,583 A | 2/1994 | Fischer et al. |
| 5,293,384 A | 3/1994 | Keeley et al. |
| 5,301,329 A | 4/1994 | Frame et al. |
| 5,325,521 A | 6/1994 | Koyama et al. |
| 5,333,285 A | 7/1994 | Drerup |

(List continued on next page.)

Primary Examiner—Peter Wong
Assistant Examiner—Tim Vo

(57) ABSTRACT

A shared bus hang prevention and recovery scheme for a data communication system is provided, where a shared bus is connected to a plurality of bus masters and corresponding slaves and located between an external bus connected to a system processor, and an internal bus connected to an internal processor. Some of the masters are associated with the external bus and others are associated with the internal bus, and one of the bus masters is a control master associated with the internal processor. The scheme utilizes a shared bus hang prevention and recovery device having a circuitry and a control code. The circuitry is timing each pending request of the control master for the shared bus and initiating bus recovery if the shared bus is hung up, when the control master exceeded a pre-determined time period allowed for waiting to acquire the shared bus control and complete the transfer on the shared bus. The control code is used for monitoring and controlling the circuitry and terminating the transfer in progress causing the shared bus hang-up. During the bus recovery the circuitry prevents bus request grants to the master attached to the external bus until the master subsequent reset, and the control program instructions initiates transfers for all pending requests for the shared bus from the control master queue. Each transfer is being timed and terminated if the shared bus is hung up again. Upon the control master queue clearing, the internal processor executes the control program instructions to reset and reinitialize all masters and slaves on the shared bus.

20 Claims, 3 Drawing Sheets

U.S. PATENT DOCUMENTS

| | | |
|---|---|---|
| 5,341,497 A | 8/1994 | Younger |
| 5,379,307 A | 1/1995 | Ishibashi et al. |
| 5,408,643 A | 4/1995 | Katayose |
| 5,454,111 A | 9/1995 | Frame et al. |
| 5,483,639 A | 1/1996 | Haeussler et al. |
| 5,500,945 A | 3/1996 | Maeda et al. |
| 5,544,332 A | 8/1996 | Chen |
| 5,598,542 A * | 1/1997 | Leung ........................ 710/117 |
| 5,627,965 A | 5/1997 | Liddell et al. |
| 5,649,096 A | 7/1997 | Desubijana et al. |
| 5,661,736 A | 8/1997 | Sferrazza et al. |
| 5,740,360 A | 4/1998 | Huckstepp |
| 5,822,777 A | 10/1998 | Leshem et al. |
| 5,845,097 A | 12/1998 | Kang et al. |
| 5,961,622 A * | 10/1999 | Hudson et al. ............. 710/107 |
| 6,292,910 B1 * | 9/2001 | Cummins .................... 714/43 |

\* cited by examiner

BUS HANG PREVENTION AND RECOVERY FOR DATA COMMUNICATION SYSTEMS EMPLOYING A SHARED BUS INTERFACE WITH MULTIPLE BUS MASTERS

BACKGROUND OF THE INVENTION

1. Field of the Invention

The present invention generally relates to bus hang prevention operations, and more particularly, to a bus hang prevention and recovery system and method for use in a multi-master bus system.

2. Description of Related Art

Digital communication over a communication channel is well known in the art. Modem data communication systems often have multiple high performance data processors and generally include a plurality of external devices interconnected by one or more various buses. For example, modem computer systems typically include a system processor coupled through a high bandwidth local expansion bus, such as the peripheral component interconnect (PCI) bus or the VESA (Video Electronics Standard Association) VL bus, to an external shared memory, peripheral devices, and other processors. Examples of devices which can be coupled to local expansion buses include SCSI adapters, network interface cards, video adapters, etc.

High performance bus architectures, such as the PCI bus architecture, provide a hardware mechanism for transferring large sequential groups of data between a peripheral controller's local memory and a system processor's shared memory via burst cycles. In many bus architectures, the maximum burst length is typically not defined.

Systems in which many devices share a common resource, typically utilize arrangements for allocating access to the resource under conditions during which a plurality of associated devices may concurrently request access. High performance systems have the potential to generate multiple independent requests for access to one or more external components, often via a single shared bus interface unit (BIU). Since multiple independent input/output (I/O) requests may appear at the BIU at any given time, the data communication system requires a shared bus arbitration scheme to determine the priority of the I/O requests for accessing the shared bus. In multi-master systems, where one or more data processors have the capability of becoming a bus master, the bus arbitration protocol determines which data processor becomes the bus master first. Typically, these multi-master systems employ an arbiter, external to the data processors, to control the shared bus arbitration, and each data processor requests access to an external shared memory or another external device from the arbiter.

In typical microprocessor systems the bus transports data among the processor and other components. The central processing unit (CPU) is usually the master of the bus, controlling the flow of data to and from the CPU and to the other components of the system, such as printers, memory, displays, and parallel and serial ports. Rather than have the CPU perform complex mathematical calculations, which is very slow, the data may be sent to the dedicated math co-processor where the calculations are performed, freeing the CPU to perform another task. Other masters in a multi-master arrangement may be used for ethernet control as part of a local area network (LAN), video controllers, or some other customized operation.

In a multi-master communication system a shared bus may become hung-up for various reasons. For example, a hang condition could happen due to an unrecognized address on a shared bus, when the system cannot abort the transfer or does not have the ability to ban the bus master from the shared bus. Sometimes a bus master does not give up the shared bus for a long time, thus causing other masters to be unable to proceed with a transfer in time. Other times a condition happening elsewhere in the system makes buffer space or data unavailable for an unacceptable amount of time, so that the bus becomes unusable.

If a bus hang condition occurs on a shared bus within a subsystem of a communication system with several subsystems, so that a transfer operation cannot be completed, it is possible that the entire subsystem will not be able to proceed any further. The subsystem processor may itself be unable to proceed (e.g. is presently attempting to read an address via the hung shared bus) and therefore cannot be used to recover from the hang condition. If the subsystem hang condition must be reset from an external source (i.e., from the system's main computer via a bus external to the subsystem), the loss of information on either transferring data and/or error conditions may occur. It may also result in the subsystem being unable to interact with other subsystems while the recovery is taking place and/or during the time it takes for the external source to realize that a problem has occurred in the subsystem. This may in turn require further recovery efforts to become necessary. In other conventional systems, the entire subsystem has to be reset, via an external source. This not only causes the loss of error/recovery information but may cause additional problems with any other subsystem of the communication system, with which the subsystem getting reset is interfacing.

Therefore, there is a need for an improved hang prevention and recovery system and method, usable in high performance multi-master data communication systems with multiple shared external devices. This system and method should be able to prevent a permanent bus hang condition and allow recovery of the subsystem to a known state, so that the propagation of problems to other subsystems, which may otherwise cause severe consequences, can be avoided.

SUMMARY OF THE INVENTION

The foregoing and other objects, features, and advantages of the present invention will be apparent from the following detailed description of the preferred embodiments which makes reference to several drawing figures.

One preferred embodiment of the present invention is a shared bus hang prevention and recovery device usable in a multi-master data communication system. The system preferably has a plurality of bus masters and corresponding slaves. The hang prevention and recovery device is connected to a shared bus, and the shared bus is located between an external bus connected to a system processor, and an internal bus connected to an internal processor. Some masters are associated with the external bus and other masters are associated with the internal bus. One bus master on the internal bus is named a control master, associated with the internal processor.

The shared bus hang prevention and recovery device has a circuitry for timing each pending request of the control master for the shared bus, and control program instructions for monitoring and controlling the circuitry. The circuitry initiates bus recovery if the shared bus became hung up, when the control master exceeded a pre-determined time period allowed for waiting to acquire the shared bus control and complete the transfer on the shared bus. At the bus hung-up, the circuitry terminates the transfer in progress, causing the shared bus hang-up to be freed, and performs shared bus recovery. During the recovery the circuitry prevents bus request grants to the master attached to the external bus until the master is subsequently reset. Next, the circuitry initiates transfers for all pending requests for the shared bus from the control master queue, where each transfer is timed and terminated if the shared bus became hung up again. Upon the control master queue clearing, the control program instructions instruct the circuitry to reset and reinitialize all masters and slaves on the shared bus.

Another embodiment of the present invention is the method for shared bus hang prevention and recovery, corresponding to the device embodiment described above.

Yet another embodiment of the present invention is a shared bus multi-master data communication system which has bus hang prevention and recovery capability. The system includes a shared bus located between an external bus connected to a system processor, and an internal bus connected to an internal processor, and a plurality of bus masters and corresponding slaves connected to the shared bus. Some of the masters are associated with the external bus and other masters are associated with the internal bus. One of the bus masters is a control master associated with the internal processor. The system has a shared bus hang prevention and recovery device connected to the shared bus. The device includes a circuitry and control program instructions. The circuitry performs timing of each pending request of the control master for the shared bus and initiates bus recovery if the shared bus became hung up, when the control master exceeded a pre-determined time period allowed for waiting to acquire the shared bus control and complete the transfer on the shared bus.

The control program instructions monitor and control the circuitry and initialize termination of the transfer in progress causing the shared bus hang-up. During the bus recovery the circuitry prevents bus request grants to the master attached to the external bus until the master subsequent reset. The circuitry initiates transfers for all pending requests for the shared bus from the control master queue, and each transfer is timed and terminated if the shared bus became hung up again. Upon the control master queue clearing, the control program instructions instruct the circuitry to reset and reinitialize all masters and slaves on the shared bus.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention is directed to a shared bus hang prevention and recovery scheme and apparatus usable in a multi-master shared bus subsystem of a communication system, which can be used to prevent a permanent bus hang condition and to allow recovery of the subsystem to a known state. The present invention can be used for optimizing the management of data within a shared bus with multiple masters, which may have a buffering capability.

In the following description numerous details, such as specific memory sizes, bandwidths, data paths, etc., are avoided because it is apparent to one skilled in the art that these specific details are not essential to the practice of the present invention. In particular, the present invention can readily be used in conjunction with a wide variety of data communication system components and bus types, each bus having its own unique protocol, bandwidth, and data transfer characteristics. It is further noted that well known electrical structures and circuits are shown in block diagram form, in a number of figures, in order not to obscure the present invention unnecessarily. Moreover, although the theoretical maximum number of masters is unlimited, the practical maximum is the number that may be accommodated by the system without causing data traffic conflicts or an appreciable slowing down of the system.

In the high performance multi-master data communication systems, various shared bus masters request long continuous burst transfers, as well as short message transfers and register access transactions, and it is important that the transactions are not being excessively delayed. The processors dispatching messages via shared bus masters requiring short burst transfer and register-to-register transfer should have the priority to quickly perform, thus freeing the processors to proceed with other tasks within the system, such as task management. The configuration should minimize the amount of time that data from a particular source must wait to be read to and written, and the latency should be minimized. It is also important for the shared bus resource to be cleared from a hang condition dynamically, and within the subsystem itself, without external help.

Figure 1:
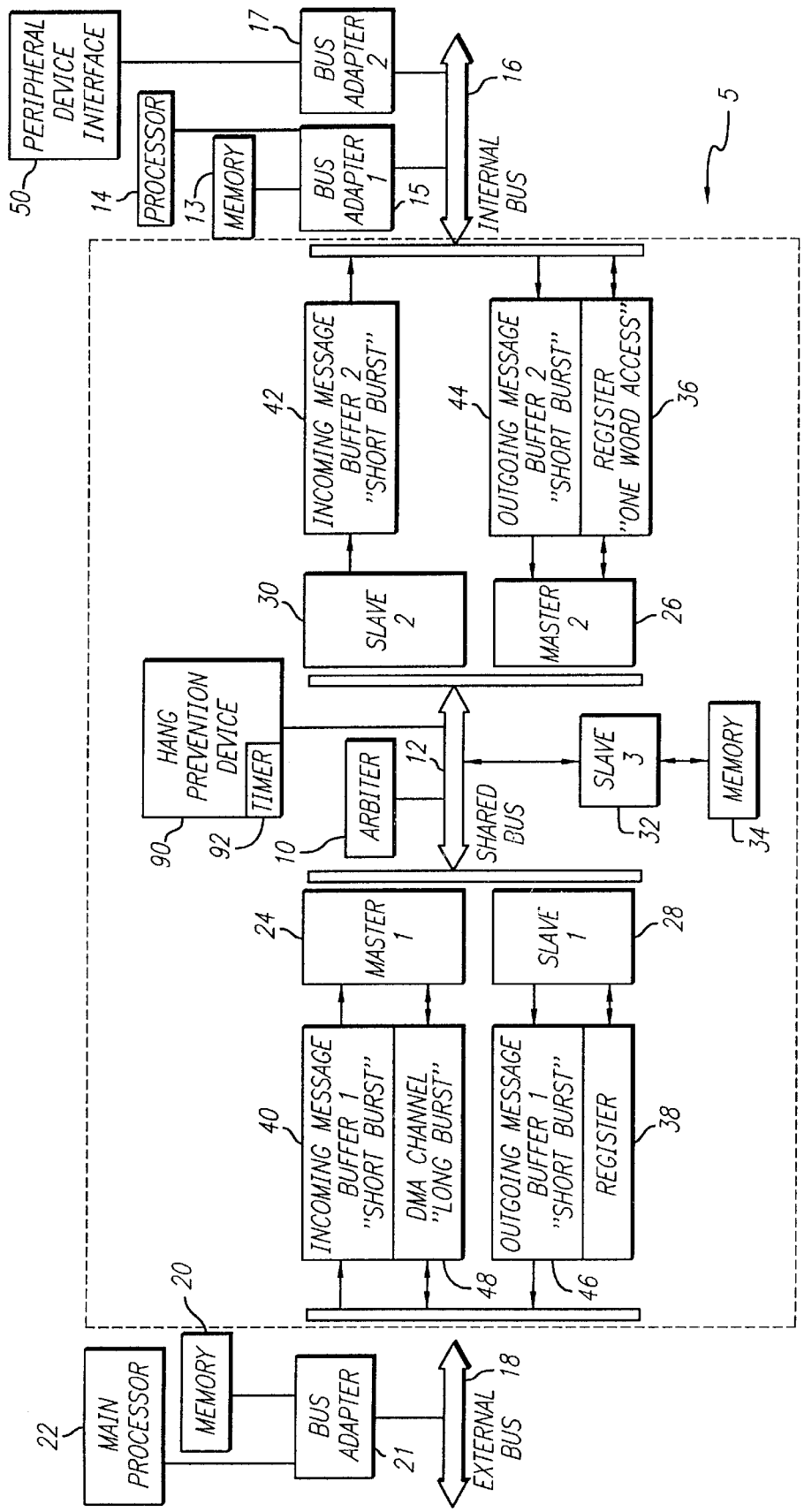
FIG. 1 illustrates a block diagram of an exemplary data communication system incorporating a bus hang prevention circuit of the present invention.

FIG. 1 illustrates, in a form of a block diagram, an exemplary embodiment of the present invention of a data communication system. The system incorporates a host adapter circuit 5, used between a host processor 22, which is the main system processor, with an external central shared memory 20, and an external peripheral device interface 50. The external peripheral device interface 50 is connected to an internal bus 16, via a bus adapter2 17, and is controlled by a processor 14, having an associated instruction and data memory 13. This architecture may be used as an adapter or a bridge between the host processor 22 and the peripheral device interface 50, and includes logic, according to the present invention, which allows data transfers between the peripheral devices, not shown, and the central shared memory 20.

As shown in FIG. 1, the processor 14 is connected to the host adapter circuitry 5 via a bus adapter1 15 and the peripheral internal bus 16, and is used to support the high level management of the interface 50 I/O operations. The host processor 22 and its associated central shared memory 20 are connected to the host adapter circuit 5 via a bus adapter 21 and a high performance external bus 18. In the preferred embodiment of the present invention, the host adapter circuit 5 acts as a bridge between the internal bus 16 and the external bus 18, and utilizes a single shared bus 12, controlled by multiple bus masters, defined below. In this system a bus arbiter 10 is utilized to decide the shared bus 12 ownership, and a hang prevention device 90 is used for prevention of the shared bus 12 hang condition.

The primary task of the bridge, such as the host adapter 5 of the present invention, is to allow data to cross from one bus to the other bus without diminishing the performance of either bus. To perform this function, the bridge must understand and participate in the bus protocol of each of the buses. In particular, the bridge must be able to serve in both a slave capacity and a master capacity so that it can accept a request from a first bus as a slave, then initiate an appropriate bus operation on the other bus as a master. The bridge must, therefore, provide support for accesses crossing from one bus to the other.

In the present invention the external bus 18 and internal bus 16 are preferably of a peripheral component interconnect (PCI) bus type. The system central shared memory 20 is preferably a cache memory. It may be a Synchronous Dynamic Random Access Memory (SDRAM), which is a high performance memory structure with clocked or pipelined interface. The peripheral device interface 50 is preferably used with ESCON interface. It also may be the small computer systems interface (SCSI) interface or Fibre Channel interface. However, it is noted that the present invention may be incorporated into any of various types of systems including various types of buses, and other system and peripheral components, as desired. For example, instead of the PCI local bus, it is noted that other local buses may be used, such as the VME bus.

The PCI bus was designed to have a high throughput and to take advantage of the increasing number of local processors that support host I/O functions. For example, most disk controllers, particularly SCSI controllers, and network interface cards (NICs) include a local processor to relieve demands on the host processor. Typically these devices have the capability of operating as bus masters, to allow them to transfer data at the highest possible rates.

In the high performance data communication system of FIG. 1 the host adapter circuit 5 acts as a PCI bus interface supporting the processor 14, acting as an ESCON or SCSI controller, and operating as the PCI bus 18 master, to perform transfers on the PCI bus 18. The publication PCI System Architecture by Tom Shanley and Don Anderson, available from Mindshare Press, 2202 Buttercup Dr., Richardson, Tex. 75082 (214) 231-2216, is hereby incorporated by reference in its entirety. For more details on the PCI bus, reference to the PCI Standard Version 2.1, from the PCI Special Interest Group in care of Intel Corp., which is hereby incorporated by reference, is advised.

The host adapter 5 of FIG. 1 includes logic that may interface to various peripherals, which may include DMA channels, memory, interrupt system, timers, a real time clock (RTC), configuration ports, diagnostic ports, and command/status registers (all not shown).

The exemplary embodiment of FIG. 1 includes several master and slave hardware circuits, such as Master1 24, Master2 26, Slave1 28, Slave2 30 and Slave3 32, all preferably implemented in a single ASIC, without any internal processor circuitry. Master1 24 is connected to and communicates with the Slave2 30, and Master2 26 is connected to the Slave1 28. Slave3 32 is connected to a local memory 34, used for the interface 50. In this architecture, only the Master1 24 supports long burst direct memory access (DMA) transfers between the local memory 34 and the central memory 20, via the external bus 18. Therefore, in this architecture all slaves 28, 30, 32 and the Master2 26 are non-streaming devices. The DMA transfers are initiated by the host adapter circuit 5, which also provides a DMA channel, not shown, and buffering for these long burst transfers. Long burst transfers include voluminous data. A request command for the DMA transfer is saved within a DMA request queue within a DMA channel long burst buffer 48, connected to the Master1 24.

In this architecture, short burst transfers occur between the external bus 18 and the internal bus 16 and preferably move between one and eight words between the processor 14 and the host processor 22. If the external bus 18 and internal bus 16 are PCI buses, short burst read and write transfers are accomplished according to the PCI protocol, and transfers can be initiated by the either bus.

Short burst transfer requests contain both the request command and message data, such as I/O addresses. When received from the external bus 18, data is queued into an incoming short burst message buffer1 40 of Master1 24. After the shared bus 12 control is acquired, data is transferred via the shared bus 12 into an incoming short burst message buffer2 42 of the Slave2 30. Short burst transfer data received from the internal bus 16 is received into an outgoing short burst message buffer2 44 of Master2 26, and afterwards transferred via the shared bus 12 into an outgoing short burst message buffer1 46 of the Slave1 28.

In the exemplary embodiment shown in FIG. 1, Master1 24 preferably supports only short burst transfers and long burst transfers. Master2 26 does not support long burst transfers but supports short burst transfers as well as one word register access transactions from Master2 registers 36 to Slave1 registers 38, requested by the processor 14. In this architecture Master1 24 and Master2 26 short burst write transfer requests are saved in a multiple-entry write queue and read transfer requests only need a one-entry read queue, because the system has to wait for the data to be read and does not save multiple read requests.

The arbiter 10 receives bus request signals from each of the shared bus 12 masters 24, 26 and selectively assigns request active status and grants ownership of the bus 12 to one master, based on a particular bus arbitration scheme. Some other bus requests may receive a bus request pending status and they are queued. After the transfer and release of the shared bus 12 by the current master, bus ownership is given to the bus master with the highest priority bus request pending status, for the next operation.

In the architecture of FIG. 1 there is a desire to keep the Master2 26 queue empty, so as not to stop processes inside the processor 14. This, the Master2 26 is the control master of the processor 14. Similarly, there is a desire to keep the Master1 24 queue empty so as not to stop processes inside the host processor 22. When a hang condition happens elsewhere in the system, making buffer space or data unavailable for an unacceptable amount of time, the shared bus 12 becomes unusable, if there is no way to prevent the permanent hung condition. For example, in the busy system of FIG. 1, a shared bus 12 master, such as the Master2 26, which is trying to send a short burst message or perform a register access transaction, such as reading a status register, could be caused to wait for a long period of time, due to access to external bus 18 not being granted. When a bus master does not give up the shared bus 12 for a long time, it is causing other masters to be unable to proceed with a transfer.

Shared bus hang conditions may occur in the multi-master communication system of FIG. 1 for various reasons. A bus hang condition may happen due to an unrecognized address on the shared bus 12, when the bus master cannot abort the transfer on the shared bus 12. The shared bus 12 could hang if a request for transfer via the external bus 18 was not granted in time by the bus adapter 21, and the buffer 40 became full, or if a deadlock occurred between the host processor 22 on the external bus 18 and the Master1 24 on the shared bus 12. Further, a hang state could happen if no slave acknowledged an address issued on the shared bus 12, or if there was a hardware problem. If a hang condition occurred on the shared bus 12, it may have locked the processor 14, if it was processing an operation which needed the shared bus 12 to complete. Thus, the subsystem processor 14 may be unable to proceed (e.g., if presently attempting to read an address via the hung shared bus 12). If a hang condition occurs on the shared bus 12 within a subsystem, so that a transfer operation cannot be completed, it is possible that the entire subsystem will not be able to proceed further.

The hung-up shared bus 12 situation may cause multiple problems, if there is no prevention and recovery. For example, if the processor 14 is unable to clean up any "in progress" transfer operations, this may cause additional error conditions when the external bus 18 is granted. Moreover, in this case the processor 14 is not able to collect and transfer information on the hang condition which had occurred, including any information it may have on what functional operations were occurring at the time of the problem. It may also result in the subsystem being unable to interact with other subsystems or the host processor 22, while the recovery is taking place, and/or during the time it takes for the external source to determine that a problem has occurred in the subsystem. The processor 14 also may not be able to maintain communication with the host processor 22, via the external bus 18, causing the host processor 22 to perform a severe recovery action, with loss of data. Therefore, the subsystem hang condition has to be reset, preferably without the loss of information on either transferring data and/or error conditions.

In the present invention, the shared bus hang prevention and recovery method and the hang prevention device 90 embodiments can be used to prevent a permanent bus hang condition and to allow recovery of the subsystem to a known state, such as reset state. The hang prevention device 90 is used to monitor the shared bus 12 and provide a way to interrupt any transfer in progress causing the hang-up. It also provides the information necessary for recovery and problem determination. The device 90 includes a timer 92, used to sequentially time the duration of each queued transfer request initiated from the Master2 26, once the request acquires the request pending status. Of all the queued transfer requests, only the one on top of the queue can have the request pending status. The others are waiting and acquiring that status one-by-one, after each completed or aborted transfer.

A pre-determined time-out period value is stored in the hang prevention device 90, to be compared to each Master2 26 actual transfer request time, and to signal a bus hung condition, if the duration of both the request pending and request active state of a requested transfer is longer than the time-out period. Thus, in the present invention the timer is used to determine whether the Master2 26 is waiting too long to acquire the shared bus 12 control and complete the transfer, since in this architecture there is a desire to keep the Master2 26 queue empty, so as not to stop processes inside the processor 14.

The time-out period is preferably chosen according to the subsystem use, so that it is equal to the greatest time period that any outstanding transfer operation in that subsystem is allowed to wait, before the transfer becomes overdue. The time-out period value may be hard-wired or changeable by a control software code, with program instructions, if so desired. The control software code used in the present invention include a hang prevention device 90 device driver, not shown, which controls and monitors the hang prevention device 90 signals, including interrupt signals. The device driver is preferably located within the processor 14, but, if desired, the hang prevention device 90 may be equipped with a hardware circuit with a processor, and include the device driver software.

The main purpose of the hang prevention device 90 is to clear the path between the shared bus 12 and the processor 14, so that the processor 14 can be freed from a hang condition. When the time-out occurs, the processor 14 is notified by the hang prevention device 90 of the bus hang condition, via an interrupt signal. For example, if the request for the shared bus 12 from the Master2 26 is active for longer than the time-out value, an interrupt is sent to the processor 14. Then, the shared bus subsystem is recovered within, despite a fault within the subsystem.

The hang prevention device 90 and method of the present invention is structured so as to not grant further access to the master attached to the external bus 18 to prevent further bus hang-ups, before the subsystem is reset. This mechanism is put in place to guarantee that the external bus 18 would not be granted to the Master1 24, once the shared bus 12 was hung-up but not yet reset. In this case, the hang prevention device 90 causes an interrupt to be issued on the external bus 18, requesting that grants for the Master1 24 be inhibited, until the shared bus 12 is reset. This protects against any erroneous operations or data being processed on the external bus 18, due to any bus hang condition on the shared bus 12.

The hang prevention device 90 waits until the external bus 18 grant is made inactive and then grants the shared bus 12 to the master attached to the internal bus 14 to retry access to the shared bus 12 and perform all transfers pending in its queue. To accomplish this, the hang prevention device 90 must first clear up the hung-up shared bus 12. Therefore, it modifies certain pre-determined shared bus 12 signals, in order to satisfy the on-going transfer operation requested by the current master of the shared bus 12, either Master1 24 or Master2 26, so that it will relinquish ownership of the hung-up shared bus 12 and allow further recovery. This may be done in any way known in the art, such as by forcing a data valid indicator or activating any termination signal(s), available on the shared bus 12 for this master.

According to the present invention, once the shared bus 12 has been freed from the initial hang-up, only the master which is in the path to the processor 14 will be allowed to gain ownership of the shared bus 12. It is the master closest to the processor 14 and located between the shared bus 12 and the processor 14. In the example of FIG. 1 it is the Master2 26. When more than one transaction is pending in the Master2 26 queue, along the shared bus 12 transfer path, the present invention attempts to complete all transfers from that queue. All queued transfer operations by this master are allowed to complete before the further bus recovery, in order to prevent loss of transfer data. Thus, the hang prevention device 90 Will allow bus operations to continue to completion or termination, until no further requests are made by that master, for a pre-determined amount of time. Therefore, each of these transfers is also timed, so that, if they do not complete in time, they are terminated in the same manner as the original bus hang condition. Therefore, the hang prevention device 90 has to time each queued Master2 26 pending transfer request and terminate the transfer, if necessary, if another hang condition occurs on the shared bus 12 during the transfer.

Preferably, a pre-determined time-out period value for the system architecture of FIG. 1 is about 8 ms. This time period should preferably be short enough to assure that the subsystem processor 14 is able to maintain communication with the host processor 22, and long enough to assure that the timer would not time-out during normal functional modes of transfer operation.

In the present invention, whenever the hang prevention device 90 terminates the transfer with the current bus master on the shared bus 12, the slave on the shared bus 12, corresponding to that master, may or may not recognize that the transfer has been aborted, and get to a transfer cleared state at the same time as the master. When the slave does not know that the transfer is completed, in the present invention the slave is prevented, by any conventional means, from propagating any further data until the slave can be reset. This is preferably accomplished, as soon as possible, by indicating to the slave that the transfer is over, or by blocking the propagation of the slave buffer data, if a reset and re-initialization become necessary.

The hang prevention device 90 waits a pre-determined amount of time after which it is reasonable that no grant will become active on the shared bus 12. Preferably, the shared bus 12 Master2 26 queue is determined to be cleared once the Master2 26 does not make a request for the shared bus 12 for 16 cycles. Therefore, when there are no outstanding transfer requests from the Master2 26, the hang prevention device 90 sends an interrupt to the processor 14, to indicate that all "in progress" transfer operations to that shared bus 12 are successfully completed or aborted, and to indicate the bus cleared status. At this point, the processor 14 can gather any information it needs to determine what type of recovery is needed, such as the status register values from Master2 registers 36 and Slave1 registers 38 from the adapter circuitry 5. It will then reset and reinitialize the adapter circuitry 5, via the cleared shared bus 12, and will not issue any further operations which need to use the shared bus 12 until the reset is completed. The reset includes a clean up and re-initialization of any master and slave on the shared bus 12, which may have been affected by the hang condition. After the reset, the timer is reinitialized and the subsystem waits for access to or from an external system within the communication system.

Figure 3:
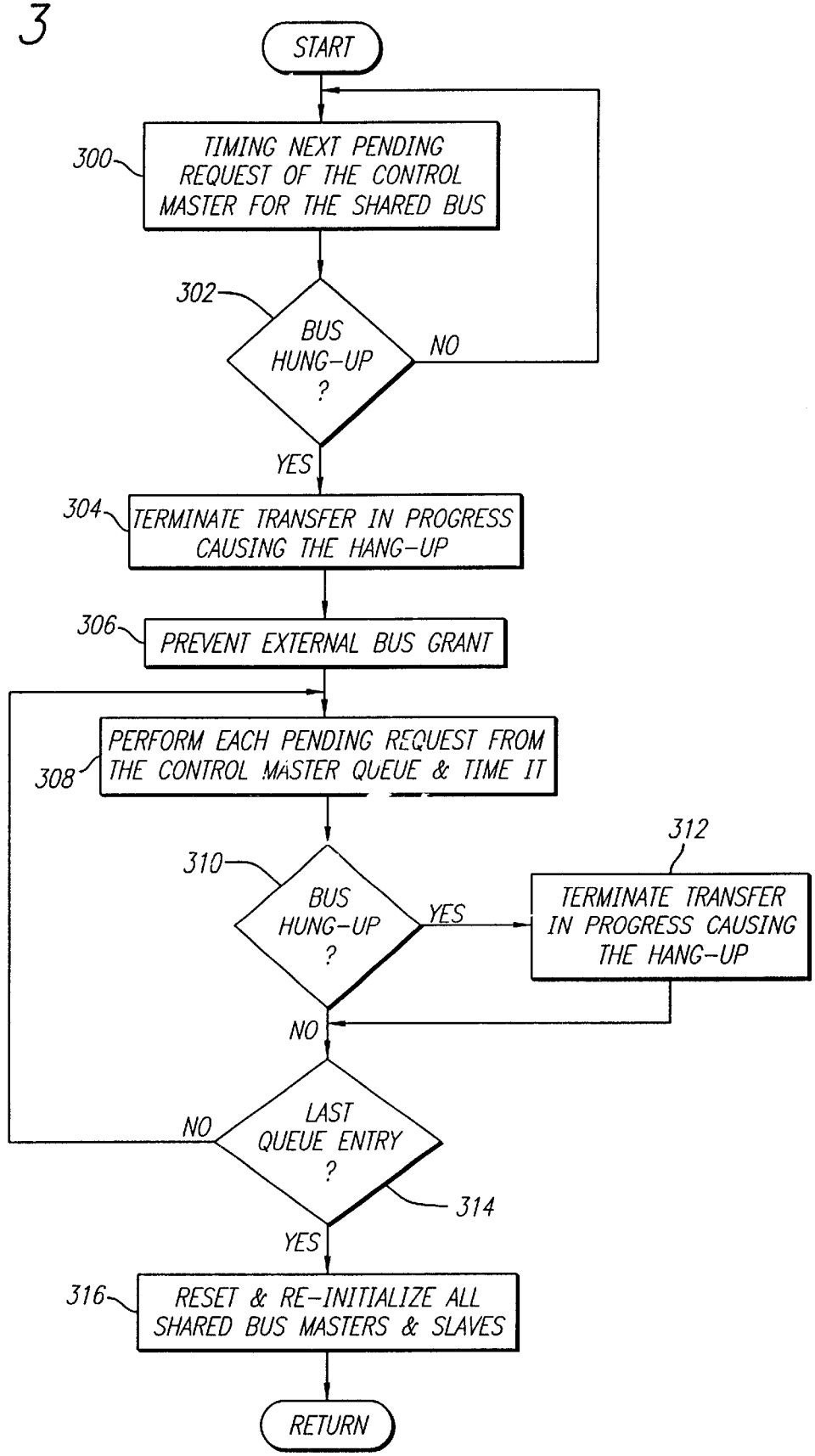
FIG. 3 illustrates a flowchart diagram showing operations of a shared bus hang prevention circuit during bus hang condition, according to the present invention.

FIG. 3 illustrates a flowchart diagram showing operations of a shared bus hang prevention circuit during bus hang condition, according to the present invention. According to FIG. 3, in block 300 a timing of each pending request of the control master for the shared bus is performed. In block 302 the timer checks whether a time-out occurred indicating the bus hang-up condition. If no time-out, the execution path continues to block 300, for the next request. If there is a bus hang-up, the bus recovery starts with block 304, to terminate the transfer in progress causing the shared bus hang-up. Next, in block 306, all bus request grants to the master attached to the external bus are prevented, until the master subsequent reset. In block 308 transfers for all pending requests for the shared bus from the control master queue are initiated, each transfer being timed. If block 310 determines another bus hang-up, block 312 terminates transfer in progress. Next, block 314 checks whether the queue is empty and if not, the execution continues with block 308. Upon the control master queue clearing, block 316 performs resetting and reinitializing all masters and slaves on the shared bus.

The shared bus hang prevention mechanism of the preferred embodiments of the present invention provides a faster and more efficient means for the hang prevention device and its control software to determine when the shared bus 12 is ready for the hang-up bus recovery step. It reduces the loss of data between the host processor 22 and processor 14, by circumventing the traditional processing steps, such as a severe subsystem reset, typically performed in conventional systems by the host processor 22.

Figure 2:
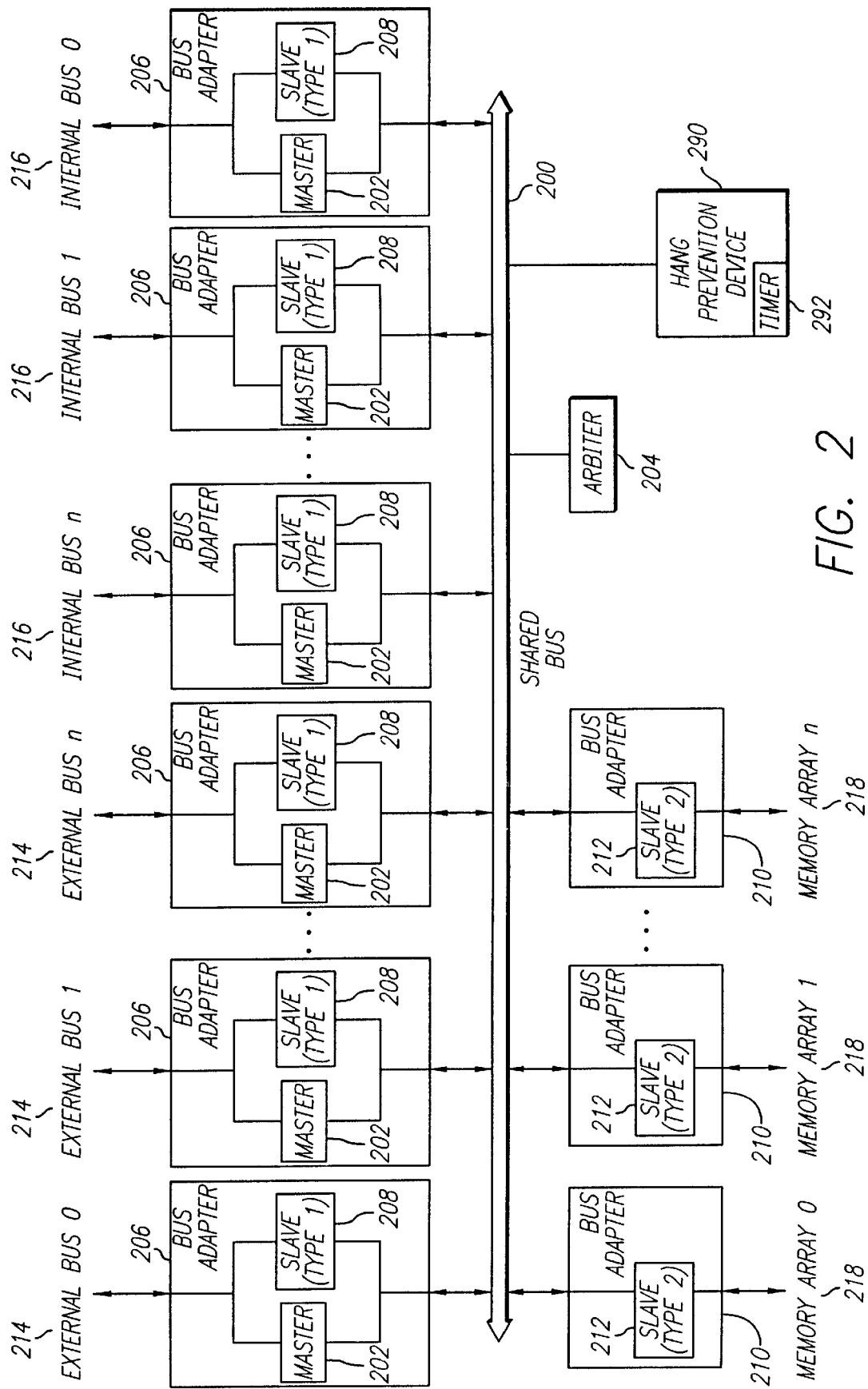
FIG. 2 illustrates a block diagram of a generalized embodiment of the present invention, presenting a data communication intermediate circuit, such as a bus hang prevention circuit.

FIG. 2 illustrates another, generalized embodiment of the present invention, presenting a data communication intermediate circuit and a method for improved management of data flow from a processor-shared memory subsystem to a plurality of interfaced system components. This circuitry includes a central arbiter 204 to a shared bus 200, configured to control the order in which access to the shared bus 200 is granted, and a hang prevention device 290, used to prevent a permanent bus hang condition and to allow recovery of the subsystem to a known state, such as reset state. The hang prevention device 290 monitors the shared bus 200 and provides a way to interrupt any transfer in progress causing the hang-up. It also provides the information necessary for recovery and problem determination.

System components may concurrently request access to the central arbiter 204 control logic in order to acquire a path through which a processor of the processor-shared memory subsystem, not shown, may directly access a peripheral component device mapped anywhere in the system memory or I/O address space. Peripheral components are preferably coupled to the shared bus 200. The bus arbiter 204 is connected to a plurality of bus master and bus slaves, wherein each master requests control of the central shared memory, a processor or a peripheral device, all not shown. The bus arbiter 204 grants control of the shared bus 200 to the bus master with the highest level priority request.

The basic operation of the system embodiment having the architecture of FIG. 2 corresponds to the data flow through the host adapter 5, described in reference to FIG. 1. A variety of optimizations of this general embodiment of the present invention can be made according to a particular implementation or needs of a particular design. For systems employing the shared bus 200 structure with multiple bus masters 202, as shown in FIG. 2 embodiment, the centralized bus arbiter 204 is utilized to decide the shared bus 200 ownership.

FIG. 2 illustrates the multi-master system having a plurality of bus adapters. The first group consists of master/slave adapters 206, each of which consists of both a master 202 and a slave 208 circuit, associated with a shared resource elsewhere within the system. The second group consists of slave adapters 210, each of which only has a slave 212 circuit, affiliated with an unshared resource elsewhere in the system. In the embodiment of FIG. 2, some slaves 208 are connected to one of external buses 214 and the others are connected to one of internal buses 216.

The slave 208, connected to a shared resource via an external bus 214 or internal bus 216, may have to wait to process the transfer via that bus, until the respective external 18 or internal bus 16 resource becomes free. However, each slave 212 connected to an unshared resource, shown in this example in conjunction with an unshared memory array 218, is characterized as always being capable of transferring data with minimal (if any) waiting, because it is directly attached to an unshared resource, only dedicated to this slave 212. Each master 202 capable of performing long burst DMA operations is assumed to have sufficient internal buffering for the full long burst read operations. If this is not the case, the DMA Master 202 relinquishes ownership of the shared bus 200, when its internal buffer becomes full.

In this embodiment, only the bus adapters 206 having a master 202 element can initiate transactions on the shared bus 200. Each bus master 202 is instructed to request the transfer on the shared bus 200 by an initiator processor, not shown. One of a plurality of initiator processors is a host processor, connected with a central shared memory, and some processors may be peripheral device processors, such as the one used for an ESCON or SCSI controller, shown in the embodiment of FIG. 1. Each initiator processor is attached either to the external bus 214 or the internal bus 216.

Each bus master 202 can be instructed to request the shared bus 200 in one of two ways. In the first method, an initiator processor on an external bus 214 or internal bus 216 wishes to write/read a short message to/from a target component, such as the central shared memory or another processor, on another internal bus 216 or external bus 214, or from/to one of the memory arrays 218. In the second method, a DMA channel within the master 202 circuit is instructed by the initiator processor to perform a long burst transaction (either write or read) between its associated internal bus 216 or external bus 214 and one of the slaves 212, for example, to transfer data between the central shared memory and one of the memory arrays 218.

Short messages may be short burst operations or register access transactions, as described previously in regard to FIG. 1 embodiment. Short messages originate from an initiator processor on an external bus 214 or internal bus 216. The short burst messages are typically 4–32 bytes in length and could be either write or read operations. Register access transactions are usually a word long, where the word usually is four bytes in length, and are processed in the same way as short burst transactions, as described below, except that instead of using buffers, data is stored in master and slave registers of master/slave adapters 206.

In the preferred embodiment of FIG. 2 the hang prevention device 290 operates in the same way as described previously. However, in this embodiment the Master2 202, associated with the internal processor on the internal bus 216 which is active when the shared bus 200 hang-up occurred, is the control master. In this case, in block 306 of FIG. 3, the bus request grants to all the masters on the shared bus 200, attached to all the external buses 214, are prevented, until the subsequent reset of the subsystem. The timer 292 is adapted for timing each pending request of each control master on the shared bus 200.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A shared bus hang prevention and recovery device in a multi-master data communication system having a plurality of bus masters and corresponding slaves, said hang prevention and recovery device connected to a shared bus located between an external bus connected to a system processor, and an internal bus connected to an internal processor, some of said masters associated with the external bus and other said masters associated with the internal bus, one of said bus masters being a control master associated with the internal processor, said device comprising:

a circuitry for timing each pending request of the control master for the shared bus;

control program instructions for monitoring and controlling said circuitry;

said circuitry initiating bus recovery if the shared bus became hung up, when the control master exceeded a pre-determined time period allowed for waiting to acquire the shared bus control and complete the transfer on the shared bus;

said circuitry terminating the transfer in progress causing the shared bus hang-up; and wherein during said bus recovery:

said circuitry preventing bus request grants to the master attached to the external bus until the master subsequent reset, said circuitry initiating transfers for all pending requests for the shared bus from the control master queue, each said transfer being timed and terminated if the shared bus became hung up again, and upon the control master queue clearing, the control program instructions instructing the circuitry to reset and reinitialize all masters and slaves on the shared bus.

2. The device according to claim 1, wherein said circuitry terminating the transfer in progress at the current bus master and the corresponding slave.

3. The device according to claim 1, wherein said control program instructions being performed inside the internal processor.

4. The device according to claim 1, wherein each said external bus and internal bus being a peripheral component interconnect (PCI) bus.

5. A method for shared bus hang prevention and recovery, useable in a multi-master data communication system having a plurality of bus masters and corresponding slaves, facilitated by a hang prevention and recovery device connected to a shared bus located between an external bus connected to a system processor, and an internal bus connected to an internal processor, some of said masters associated with the external bus and other said masters associated with the internal bus, one of said bus masters being a control master associated with the internal processor, said method comprising the steps:

(a) timing each pending request of the control master for the shared bus;

(b) initiating bus recovery if the shared bus became hung up, when the control master exceeded a pre-determined time period allowed for waiting to acquire the shared bus control and complete the transfer on the shared bus; and wherein said bus recovery including the steps:

(c) terminating the transfer in progress causing the shared bus hang-up, (d) preventing bus request grants to the master attached to the external bus until the master subsequent reset, (e) initiating transfers for all pending requests for the shared bus from the control master queue, each said transfer being timed and terminated if the shared bus became hung up again, and (f) upon the control master queue clearing, resetting and reinitializing all masters and slaves on the shared bus and re-enabling the timing function.

6. The method according to claim 5, wherein the step of terminating the transfer in progress including terminating the transfer at the current bus master and the corresponding slave.

7. The method according to claim 5, further having the step of continuing recovery action within all affected elements of the communication system.

8. The method according to claim 5, wherein each said external bus and internal bus being a peripheral component interconnect (PCI) bus.

9. A shared bus hang prevention and recovery device in a multi-master data communication system having a plurality of bus masters and corresponding slaves, said hang prevention and recovery device connected to a shared bus located between an external bus connected to a system processor, and an internal bus connected to an internal processor, some of said masters associated with the external bus and other said masters associated with the internal bus, one of said bus masters being a control master associated with the internal processor, said device comprising:

a circuitry having a timer corresponding to said control master, containing a pre-determined time-out period indicating maximum time the control master being allowed to wait for and complete the transfer on the shared bus;

control program instructions for monitoring and controlling said circuitry;

said timer timing the duration of each pending request of the control master for the shared bus and, if the control master waiting to acquire the shared bus control and complete the transfer for longer than the time-out period, said circuitry producing a time-out interrupt for the control program instructions, notifying a bus hung condition; and wherein upon the shared bus hang-up condition:

said control program instructions initiating termination of the transfer in progress causing the shared bus hang-up, whereby causing release of ownership of the shared bus by one of said plurality of bus masters currently accessing said bus, to clear the path between the shared bus and the internal processor, said circuitry preventing bus request grants to the master attached to the external bus until the master subsequent reset, said circuitry granting access of the shared bus to the control master, in response to said releasing ownership of said bus by the current bus master, and initiating transfers for all pending requests for the shared bus from the control master queue, each said transfer being timed by the timer and terminated if a time-out occurred again, and upon the control master queue clearing, the control program instructions instructing the circuitry to reset and reinitialize all masters and slaves on the shared bus and the timer.

10. The device according to claim 9, wherein said circuitry terminating the transfer in progress at the current bus master and the corresponding slave.

11. The device according to claim 9, wherein said control program instructions being performed inside the internal processor.

12. The device according to claim 9, wherein each said external bus and internal bus being a peripheral component interconnect (PCI) bus.

13. A shared bus multi-master data communication system having bus hang prevention and recovery capability, comprising:

a shared bus located between an external bus connected to a system processor, and an internal bus connected to an internal processor;

a plurality of bus masters and corresponding slaves connected to the shared bus, some of said masters associated with the external bus and other said masters associated with the internal bus, and one of said bus masters being a control master associated with the internal processor;

a shared bus hang prevention and recovery device connected to the shared bus and having a circuitry and control program instructions;

said circuitry timing each pending request of the control master for the shared bus and initiating bus recovery if the shared bus became hung up, when the control master exceeded a pre-determined time period allowed for waiting to acquire the shared bus control and complete the transfer on the shared bus; and said control program instructions for monitoring and controlling said circuitry and for initializing termination of the transfer in progress causing the shared bus hang-up, wherein during said bus recovery:

said circuitry preventing bus request grants to the master attached to the external bus until the master subsequent reset, said circuitry initiating transfers for all pending requests for the shared bus from the control master queue, each said transfer being timed and terminated if the shared bus became hung up again, and upon the control master queue clearing, the control program instructions instructing the circuitry to reset and reinitialize all masters and slaves on the shared bus.

14. The system according to claim 13, wherein said circuitry terminating the transfer in progress at the current bus master and the corresponding slave.

15. The system according to claim 13, wherein said control program instructions being performed inside the internal processor.

16. The system according to claim 13, wherein each said external bus and internal bus being a peripheral component interconnect (PCI) bus.

17. A shared bus multi-master data communication system having bus hang prevention and recovery capability, comprising:

a shared bus connected to a plurality of subsystems, each said subsystem connected to an external bus attached to a system processor, and to an internal bus attached to an internal processor;

each said subsystem having a bus master connected between the external bus and the shared bus and a corresponding slave connected between the internal bus and the shared bus, and having a control master associated with the subsystem internal processor and connected between the internal processor and the shared bus and a corresponding slave connected between the external bus and the shared bus;

a shared bus hang prevention and recovery device connected to the shared bus and having a circuitry and control program instructions;

said circuitry timing each pending request of each said subsystem control master for the shared bus and initiating bus recovery if the shared bus became hung up, when the control master exceeded a pre-determined time period allowed for waiting to acquire the shared bus control and complete the transfer on the shared bus; and said control program instructions for monitoring and controlling said circuitry and for initializing termination of the transfer in progress causing the shared bus hang-up, wherein during said bus recovery:

said circuitry preventing bus request grants to all said subsystem bus masters attached to the external buses until the master subsequent reset, said circuitry initiating transfers for all pending requests for the shared bus from the control master queue of the subsystem hanging the bus, each said transfer being timed and terminated if the shared bus became hung up again, and upon the control master queue clearing, the control program instructions instructing the circuitry to reset and reinitialize all masters and slaves on the shared bus.

18. The system according to claim 17, wherein said circuitry terminating the transfer in progress at the current bus master and the corresponding slave.

19. The system according to claim 17, wherein said control program instructions being performed inside the internal processor.

20. The system according to claim 17, wherein each said external bus and internal bus being a peripheral component interconnect (PCI) bus.

* * * * *